(12) United States Patent
Haberzettl et al.

(10) Patent No.: US 10,393,177 B2
(45) Date of Patent: Aug. 27, 2019

(54) SLIDING BEARING DEVICE

(71) Applicant: Deutsches Zentrum fuer Luft- und Raumfahrt e.V., Cologne (DE)

(72) Inventors: Andreas Haberzettl, Flein (DE); Hermann Hald, Weissach (DE); Wolfgang Kitsche, Jagsthausen (DE); Markus Ortelt, Flein (DE)

(73) Assignee: Deutsches Zentrum fuer Luft-und Raumfahrt e.V., Cologne (DE)

( * ) Notice: Subject to any disclaimer, the term of this patent is extended or adjusted under 35 U.S.C. 154(b) by 0 days.

(21) Appl. No.: 15/865,398

(22) Filed: Jan. 9, 2018

(65) Prior Publication Data

US 2018/0258989 A1     Sep. 13, 2018

Related U.S. Application Data

(63) Continuation of application No. PCT/EP2016/067345, filed on Jul. 20, 2016.

(30) Foreign Application Priority Data

Jul. 21, 2015  (DE) .................. 10 2015 111 788

(51) Int. Cl.
  *F16C 33/10*  (2006.01)
  *F16C 37/00*  (2006.01)
  *F16C 33/20*  (2006.01)
  *B29C 70/06*  (2006.01)
  *F16C 33/18*  (2006.01)
  (Continued)

(52) U.S. Cl.
  CPC ............ *F16C 33/104* (2013.01); *B29C 70/06* (2013.01); *F16C 33/18* (2013.01); *F16C 33/201* (2013.01); *F16C 33/208* (2013.01); *F16C 33/24* (2013.01); *F16C 37/002* (2013.01);
  (Continued)

(58) Field of Classification Search
  CPC .......... F16C 33/04; F16C 33/18; F16C 33/24; F16C 33/201; F16C 33/208; F16C 37/002; F16C 2208/02; F16C 2360/44; F16C 33/043; B29C 7/06; B29C 7/10; B29C 70/06; B29C 70/10
  USPC ........ 384/100, 276, 279–280, 297–298, 902, 384/911; 264/45.3, 48; 428/293.4, 428/293.7, 295.4, 295.7, 296.7, 29, 428/311.51; 29/898.042
  See application file for complete search history.

(56) References Cited

U.S. PATENT DOCUMENTS 2,086,787 A   7/1937  Whiteley
2,908,455 A   10/1959 Hoadley
(Continued)

FOREIGN PATENT DOCUMENTS

DE   2933942    3/1981
DE   9011140    12/1990
(Continued)

*Primary Examiner* — Marcus Charles
(74) *Attorney, Agent, or Firm* — Lipsitz & McAllister, LLC

(57) ABSTRACT

A sliding bearing device is proposed which comprises a bearing seating having a first sliding surface and a bearing body having a second sliding surface, wherein the bearing body is accommodated by the bearing seating and the first sliding surface and the second sliding surface face each other, wherein the bearing seating and/or the bearing body is made of an open-pore fiber composite material at least in a sliding region which forms the respective sliding surface.

18 Claims, 8 Drawing Sheets

(51) Int. Cl.
*F16C 33/24* (2006.01)
*F16C 33/04* (2006.01)

(52) U.S. Cl.
CPC ........ *F16C 33/043* (2013.01); *F16C 2208/02* (2013.01); *F16C 2360/44* (2013.01)

(56) References Cited

U.S. PATENT DOCUMENTS

| | | | |
|---|---|---|---|
| 2,941,759 A | | 6/1960 | Rice et al. |
| 3,138,009 A | | 6/1964 | McCreight |
| 3,445,148 A | * | 5/1969 | Grad ................ B22F 3/1109 |
| | | | 29/898.054 |
| 3,679,539 A | * | 7/1972 | Kammermeier ........ B29C 44/12 |
| | | | 428/149 |
| RE27,917 E | * | 2/1974 | Jefferson et al. .. C08G 18/5021 |
| | | | 206/819 |
| 3,825,364 A | | 7/1974 | Halila et al. |
| 3,846,216 A | * | 11/1974 | Streeter ................. B60C 9/00 |
| | | | 428/101 |
| 4,482,111 A | | 11/1984 | Le Touche |
| 4,569,878 A | * | 2/1986 | Barrall ................... B32B 7/12 |
| | | | 156/325 |
| 5,525,558 A | * | 6/1996 | Niwa ................... C04B 35/83 |
| | | | 156/242 |
| 5,792,717 A | | 8/1998 | Takayama |
| 7,055,781 B2 | | 6/2006 | Behrens et al. |
| 7,246,993 B2 | | 7/2007 | Bolms et al. |
| 7,275,720 B2 | | 10/2007 | Behrens et al. |
| 7,281,688 B1 | | 10/2007 | Cox et al. |
| 7,402,335 B2 | | 7/2008 | Bolms et al. |
| 7,459,207 B2 | | 12/2008 | Peschany |
| 7,703,983 B2 | * | 4/2010 | Tsutsui ..................... C08J 9/40 |
| | | | 384/276 |
| 8,262,290 B2 | * | 9/2012 | Feldmeier ........... F16C 33/6648 |
| | | | 384/469 |
| 8,376,617 B2 | * | 2/2013 | Schroeder ............. F16C 33/08 |
| | | | 384/97 |
| 8,491,194 B2 | * | 7/2013 | Hagan ................. F16C 37/002 |
| | | | 384/278 |
| 8,967,869 B2 | * | 3/2015 | Schneider ............ F16C 33/103 |
| | | | 384/129 |
| 2001/0051258 A1 | * | 12/2001 | Hanzawa ............. C04B 35/573 |
| | | | 428/293.4 |
| 2002/0001420 A1 | * | 1/2002 | Tanaka ................. F16C 23/041 |
| | | | 384/279 |
| 2004/0146399 A1 | | 7/2004 | Bolms et al. |
| 2005/0045306 A1 | | 3/2005 | Petervary et al. |
| 2006/0153685 A1 | | 7/2006 | Bolms et al. |
| 2007/0232502 A1 | | 10/2007 | Tsutsui et al. |
| 2007/0242910 A1 | * | 10/2007 | Akita ................... C10M 101/02 |
| | | | 384/279 |
| 2008/0102246 A1 | | 5/2008 | Peschany |
| 2008/0247693 A1 | | 10/2008 | Schroeder et al. |
| 2009/0087126 A1 | | 4/2009 | Hagan et al. |
| 2009/0154990 A1 | * | 6/2009 | Julliere ............... F16C 33/1095 |
| | | | 403/141 |
| 2010/0183254 A1 | * | 7/2010 | Jensen ................. F16C 33/043 |
| | | | 384/279 |
| 2011/0253344 A1 | | 10/2011 | Kuhn et al. |
| 2012/0237759 A1 | * | 9/2012 | Ehbing ..................... B32B 5/08 |
| | | | 428/319.3 |
| 2013/0065801 A1 | * | 3/2013 | Schneider ............. F16C 33/103 |
| | | | 508/103 |
| 2014/0334164 A1 | * | 11/2014 | Miyata ................. H05K 1/0256 |
| | | | 362/382 |

FOREIGN PATENT DOCUMENTS

| | | | | |
|---|---|---|---|---|
| DE | 19519468 | | 11/1995 | |
| DE | 19524510 | | 1/1997 | |
| DE | 102005019730 | | 11/2006 | |
| DE | 102005030047 A | * | 1/2007 | ............ B29B 11/16 |
| DE | 102008057428 | | 5/2010 | |
| DE | 202012100865 | | 8/2012 | |
| DE | 102011052000 | | 10/2012 | |
| DE | 102013219765 | | 4/2015 | |
| EP | 0073688 | | 3/1983 | |
| EP | 0752538 | | 1/1997 | |
| EP | 1496140 | | 1/2005 | |
| EP | 1500880 | | 1/2005 | |
| EP | 1641959 | | 6/2007 | |
| JP | 01142215 A | * | 6/1989 | ............ F16C 17/18 |
| JP | 10026142 A | * | 1/1998 | |
| JP | 2001271083 | | 10/2001 | |
| JP | 2002293665 | | 10/2002 | |
| JP | 2004122674 A | * | 4/2004 | ............ B05D 5/12 |
| JP | 2009204034 A | * | 9/2009 | |
| WO | 03006883 | | 1/2003 | |

* cited by examiner

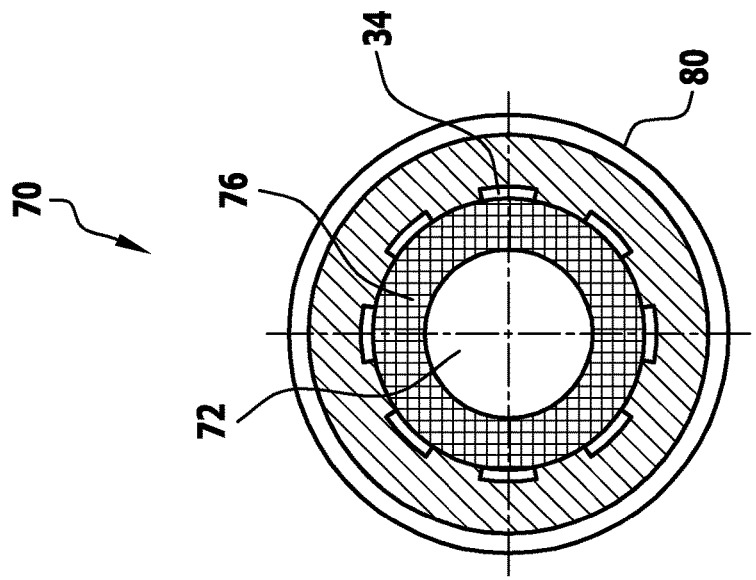
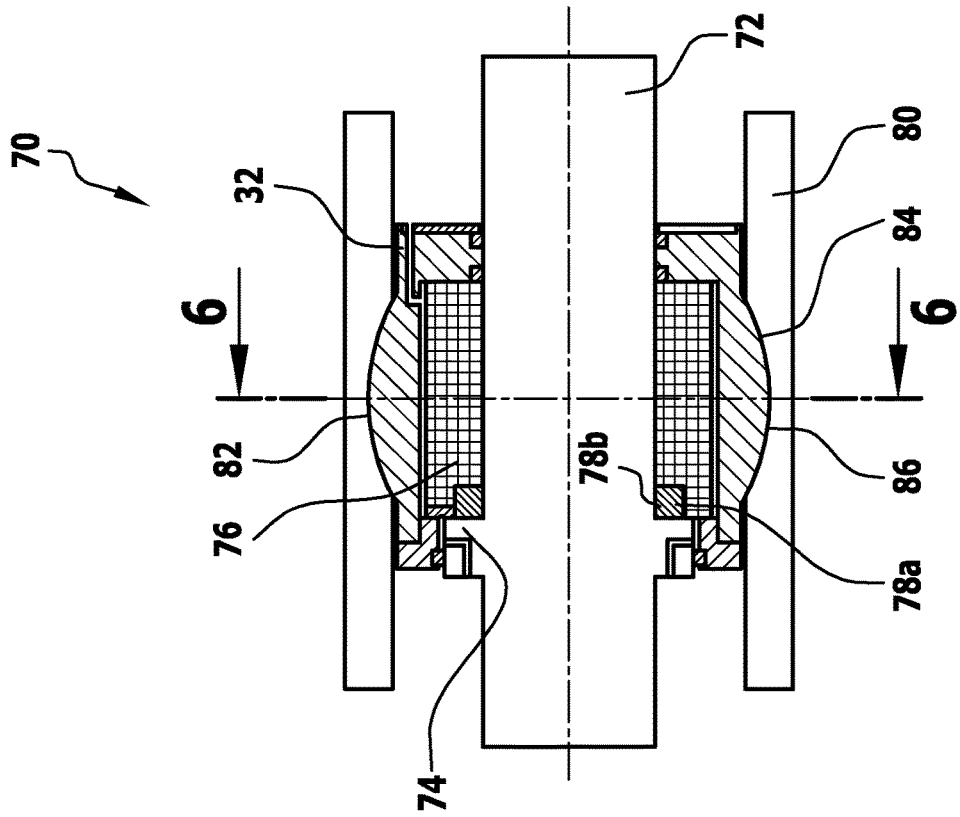

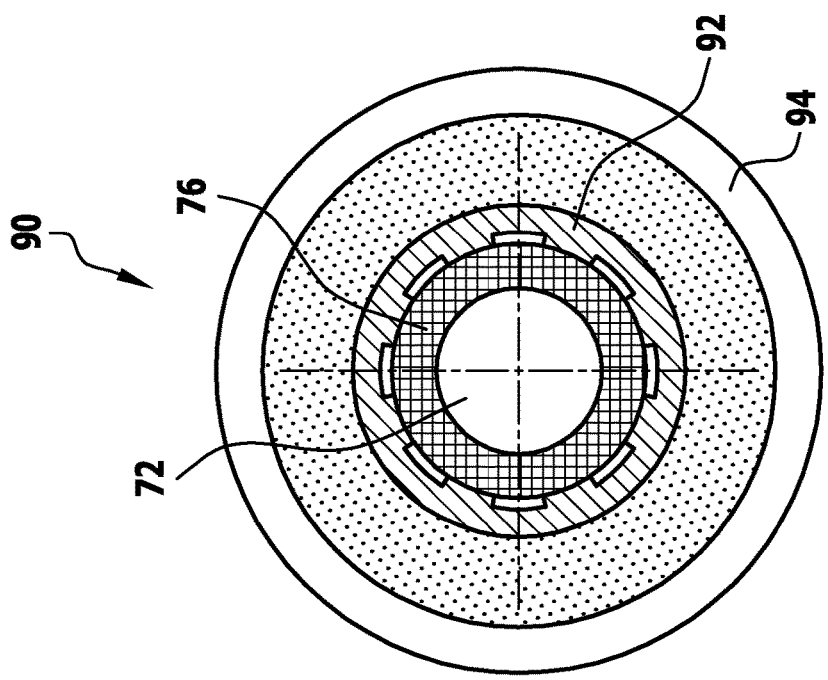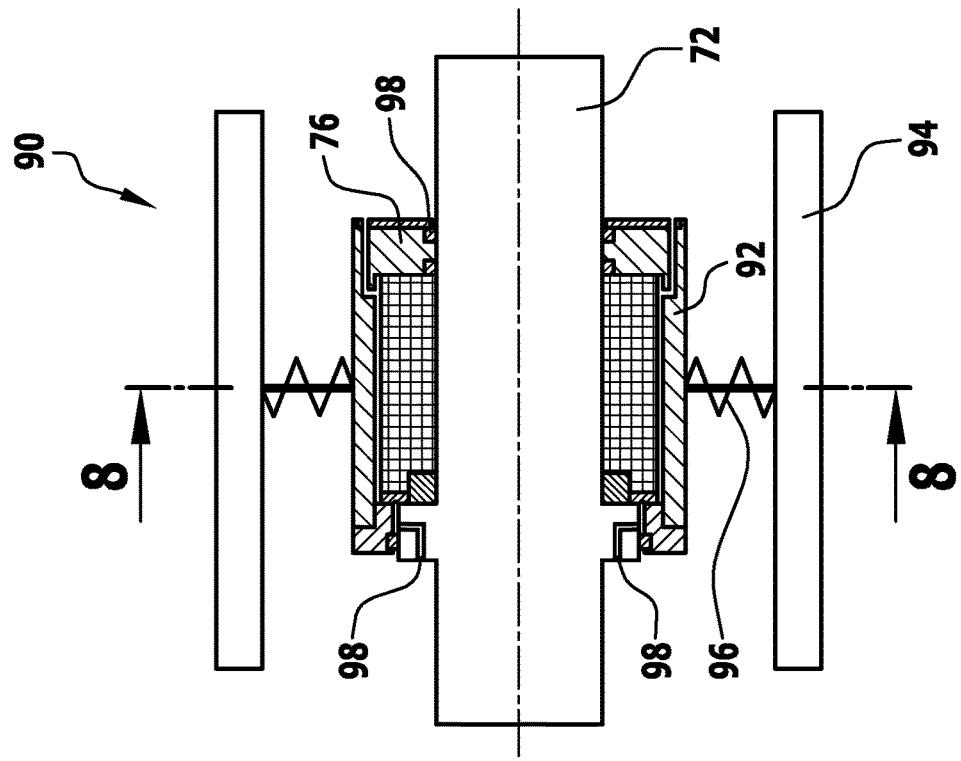

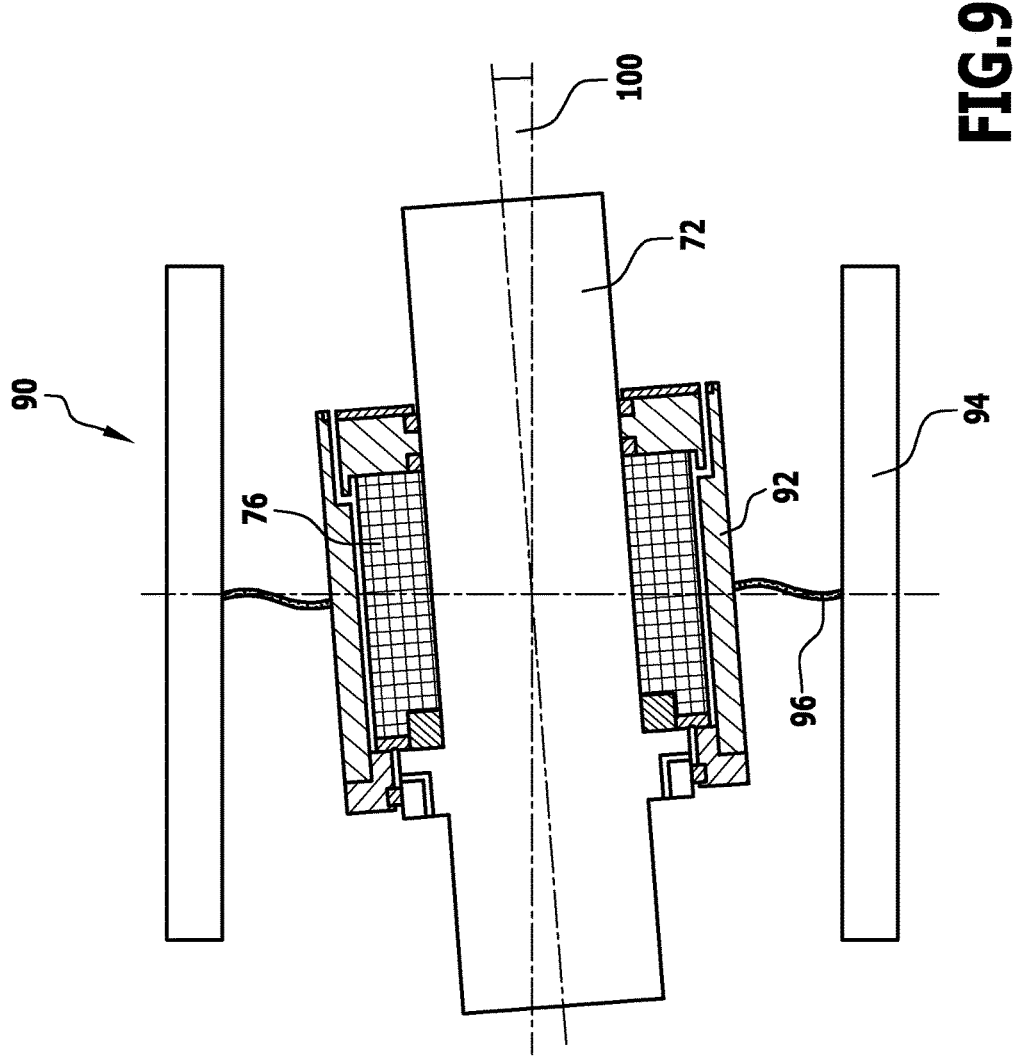

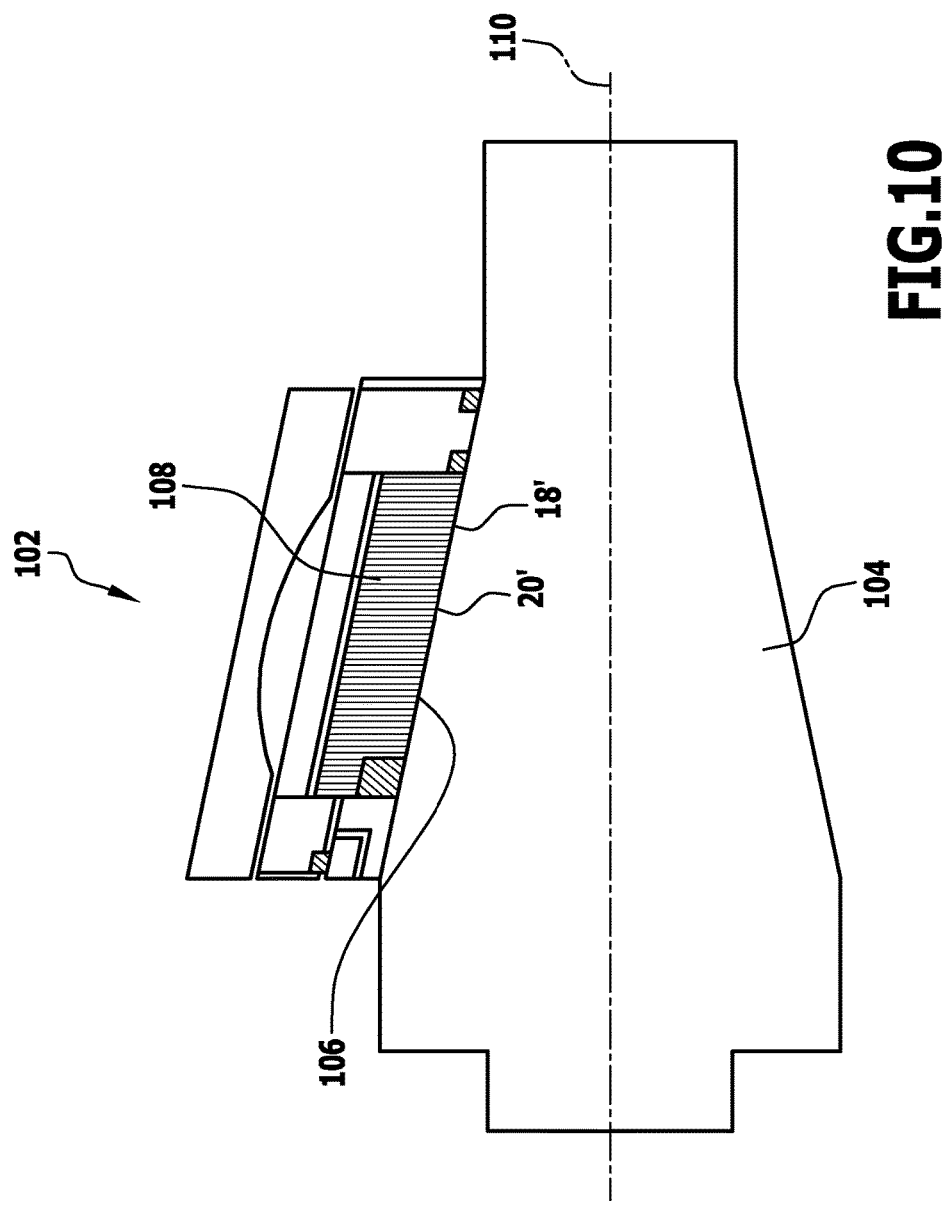

SLIDING BEARING DEVICE

CROSS-REFERENCE TO RELATED APPLICATIONS

This application is a continuation of international application number PCT/EP2016/067345 filed on Jul. 20, 2016 and claims the benefit of German application number 10 2015 111 788.6 filed on Jul. 21, 2015, which are incorporated herein by reference in their entirety and for all purposes.

BACKGROUND OF THE INVENTION

The invention relates to a sliding bearing device comprising a bearing seating having a first sliding surface and a bearing body having a second sliding surface, wherein the bearing body is accommodated by the bearing seating and the first sliding surface and the second sliding surface face each other.

In accordance with the present invention, a sliding bearing device is provided, which exhibits a high load tolerance.

From DE 195 24 510 A1, there is known a fluid-lubricated sliding bearing wherein a hard and a soft material serve as sliding partners. The hard partner consists of metal and the soft partner consists of carbon-fibre-reinforced carbon.

From U.S. Pat. No. 2,086,787, there is known a self-lubricating bearing.

From DE 10 2008 057 428 A1, there is known a protective structure.

From DE 10 2005 019 730 A1, there is known a plate-like carbon fibre composite material.

From DE 29 33 942 A1, there is known a bearing for rotors, shafts or the like having two units that are arranged within one another and are rotatable relative to one another. Each unit comprises a bearing surface which is in contact with the bearing surface of the other unit. Each of these bearing surfaces consists of graphite impregnated with silicon or of Silmor.

From DE 20 2012 100 865 U1, there is known a free piston motor generator.

From DE 90 11 140 U1, there is known an electrically and heat conductive carbon-containing slide piece comprising two bodies that are connected to one another.

From DE 10 2013 219 765 A1, there is known a heat-conductive, fibre-reinforced plastics material for electric motor housings.

SUMMARY OF THE INVENTION

In accordance with an embodiment of the invention, the bearing seating and/or the bearing body is made of an open-pore fibre composite material at least in a sliding region which forms the respective sliding surface.

Due to the open-pore structure, channels are formed through which the first sliding surface and the second sliding surface can be controlled and effectively lubricated as well as be cooled. A lubricating fluid and/or cooling fluid (a fluidic medium such as a gas or a liquid) can be guided in such a way that it will be applied to the entire contact area between the bearing body and the bearing seating, i.e. the entire first sliding surface and the entire second sliding surface. A lubricating film is then effective directly on the relevant points of friction and, at the same time, a cooling effect is produced directly at those points where heat ensues when the sliding bearing device is operative.

Lubricating medium is not gradually used up at the sliding surfaces but can be constantly supplied and proportioned locally over a large area.

Gap cavitation for a lubricating fluid or cooling fluid is prevented by an appropriate active application of pressure over a large area.

The element of the sliding bearing device which is made of a fibre composite material has a very low thermal coefficient of expansion if it consists of a ceramic or of C/C (carbon incorporating carbon fibres) for example. (C/C does not exhibit thermal expansion.) This thereby results in advantageous properties.

The porosity and permeability can in principle be adjusted in the open-pore fibre composite material and spatially inhomogeneous regions can also be set-up thereby. Optimized lubrication or cooling can thereby be achieved for a corresponding application.

Improved ductility in comparison with monolithic ceramic materials can be achieved, i.e. the danger of a brittle fracture is greatly reduced by the employment of a ceramic fibre composite material or C/C.

This results in very good emergency running properties. Fibres such as carbon fibres have a reduced susceptibility to wear compared with graphite for example. They also provide a high degree of slippage between a bearing body and a bearing seating when running dry.

In some circumstances, a dry bearing can also be formed, in particular, if the open-pore fibre composite material is C/C, i.e. it is an open-pore carbon body incorporating carbon fibres.

A sliding bearing device can be obtained which withstands heavy loads in regard to rotational speed and forces and it exhibits a high degree of reliability together with a long lifetime and low production costs.

A typical average size (diameter) of the pores lies in a range of between 5 µm 40 µm and in particular between 10 and 20 µm. In particular, the pores develop in the open-pore structure in the course of a pyrolysis process in which chemical decomposition of e.g. a resin takes place.

In one exemplary embodiment, provision is made for the fibres to be carbon fibres. Such carbon fibres exhibit good sliding properties.

In principle, it is possible for only the bearing seating to be made of the open-pore fibre composite material, for only the bearing body to be produced accordingly, or for both the bearing seating and the bearing body to be produced accordingly.

The sliding region is that region which comprises the sliding surface. In principle thereby, it is possible for the bearing seating or the bearing body to be formed entirely from the open-pore fibre composite material, or only that region, i.e. the sliding region, which is relevant for the sliding properties.

In one exemplary embodiment, the bearing seating and/or the bearing body are made entirely of the same fibre composite material and are thus also entirely open pored.

It is also possible for the bearing seating and/or the bearing body to comprise a carrier region on which the sliding region is arranged, wherein the material of the sliding region and a material of the carrier region are different. The materials can thereby be different in regard to their chemical properties and/or physical properties. Optimization of the bearing seating or the bearing body can thus be carried out. For example, the carrier region is formed in such a way that it has greater mechanical rigidity. The sliding region serves for the optimization of the sliding properties and in particular too for providing emergency running properties. Optimization of the sliding bearing device as a whole can thus be achieved. Thereby, the carrier region can be made of a material which is not open pored or is not a fibre composite material. However, it could also be produced as an open-pored structure or be made of a fibre composite material, wherein the corresponding material is not then the same as for the sliding region.

It is expedient if there is provided a fluid supply device by means of which a flowable fluid and in particular a lubricating fluid and/or a cooling fluid is provided to channels of the bearing seating and/or the bearing body, wherein the channels are formed by the open-pored structure and lead to the respective sliding surface. Local application of fluid to the first sliding surface and the second sliding surface over a large surface area can thereby be achieved. Gap cavitation is prevented. Direct application to the "source of friction" and the "source of heat" is achieved.

In particular, it is advantageous if the open-pored structure is formed in such a way that fluid and in particular lubricating fluid and/or cooling fluid is suppliable to the whole of the first sliding surface which is in sliding contact with the second sliding surface, and/or to the whole of the second sliding surface which is in sliding contact with the first sliding surface. Optimal lubrication and cooling are thereby achieved.

Provision may be made for the fibres within the sliding region to be arranged in such a way that they end at the associated sliding surface at an acute angle and in particular in an angular range of at least 45° to the sliding surface (this corresponds to an angle of at most 45° to a normal of the sliding surface). Thus, in a manner of speaking, the fibres come up against the corresponding sliding surface. Then, in the event of surface degradation, there will be no severence of the supporting fibre strands. Only the ends of the fibres will degrade which is structurally uncritical. The ends of the fibres appearing at the sliding surface exhibit "lubricating properties". The wear is considerably less than the wear of graphite for example. All or only a portion of the fibres can, as mentioned, be arranged at an acute angle.

As an alternative or in addition thereto, it is also possible for the fibres to be arranged in such a way that they run parallel to the respective sliding surface on the sliding surface. Severance of the supporting fibre strands is thereby also prevented in the event of surface degradation. Good sliding properties ensue. All or only a portion of the fibres can, as mentioned, be aligned in parallel.

In one exemplary embodiment, provision is made for a heat dissipating device which, in particular, is made of a material having metallic thermal conductivity to be arranged on the bearing seating and/or on the bearing body and for fibres to lead to the heat dissipating device, wherein, in particular, these fibres are pitch fibres. Heat can thereby be optimally removed from a frictional surface between the bearing seating and the bearing body. The heat dissipating device which is made of copper for example provides adequately good heat dissipation. Pitch fibres are carbon fibres which are produced as a precursor on the basis of pitch. They exhibit a very high thermal conductivity. Then, in addition to the advantages described above, heat can be optimally removed from a frictional surface thereby.

It is expedient if the heat dissipating device is galvanized and, in particular, is galvanized in a region which is spaced from the corresponding sliding surface. Thermal bridges which are detrimental to the heat dissipation process can, to a large extent, be prevented by galvanizing.

In one exemplary embodiment, the bearing seating and/or the bearing body comprises a plurality of ring segments or disk segments which are connected to one another, whereby, in particular, a ring segment and a disk segment are produced by means of one or more layers of a woven fabric or a knitted fabric or a non-crimp fabric. A bearing body in the form of a shaft for example (wherein disk elements in particular are then provided) or a bearing seating in the form of a sleeve (wherein ring elements are then provided) can thereby be produced in a simple manner. In particular, the effect can thereby be achieved in a simple manner that fibres end on the corresponding sliding surface at an acute angle, i.e. come up against the sliding surface.

A particularly advantageous fibre composite material is C/C. The corresponding material is open pored having a carbon phase in which carbon fibres are embedded. This material does not exhibit thermal expansion. It does not exhibit a melting phase. In particular thereby, a dry bearing can be realized or a corresponding sliding bearing device exhibits very good emergency running properties. Due to fact that there is no melting phase in the case of C/C, then, in the event of degradation spalling for example will occur, thereby guaranteeing that no blockage of the bearing or the like will occur.

It is also possible for the fibre composite material to be a ceramic fibre composite material (CMC material) or to be a metallic material incorporating fibres. In the case of a ceramic fibre composite material, the fibres are accordingly embedded in a ceramic matrix. In the case of a metallic material, the fibres are embedded in a porous metallic matrix.

Provision may be made hereby for the bearing seating and/or the bearing body to be formed in such a way that the open porosity and/or a thickness of the bearing seating and/or the thickness of the bearing body varies along at least one direction so that, in particular, different flow properties for a fluid are set. The application of a lubricating fluid and/or a cooling fluid to the first sliding surface and the second sliding surface can be controlled by virtue of a spatially varying adjustment of the open porosity or permeability.

For example, the bearing body is a shaft and the bearing seating is a shaft holder and/or the bearing seating is a ring element and the bearing body is a rod, or the bearing body is a ball bearing and the bearing seating is a bearing shell. In principle thereby, the shaft can be an external shaft or an internal shaft. Other set-ups are also conceivable.

A sliding bearing device in accordance with the invention can then be employed, in particular, in the case where high rotational speeds or heavy loads occur. For example, a sliding bearing device in accordance with the invention is used for a turbopump and in particular there, for mounting a corresponding blade leaf. A sliding bearing device in accordance with the invention can also be advantageously employed in a turbine. It can also be used in connection with a free piston linear motor for example in order to support a linearly-moveable piston device.

The following description of preferred embodiments serves in conjunction with the drawings to provide a more detailed explanation of the invention.

BRIEF DESCRIPTION OF THE DRAWINGS

FIG. 5 a sectional view of a further exemplary embodiment of a sliding bearing device in accordance with the invention;

FIG. 6 a sectional view along the line 6-6 in accord with FIG. 5;

FIG. 7 a schematic sectional view of a further exemplary embodiment of a sliding bearing device in accordance with the invention;

FIG. 8 a sectional view along the line 8-8 in accord with FIG. 7;

FIG. 9 a similar view of the sliding bearing device in accord with FIG. 7 in a tilted position;

FIG. 10 a partial sectional view of a further exemplary embodiment of a sliding bearing device in accordance with the invention.

DETAILED DESCRIPTION

Figure 1:
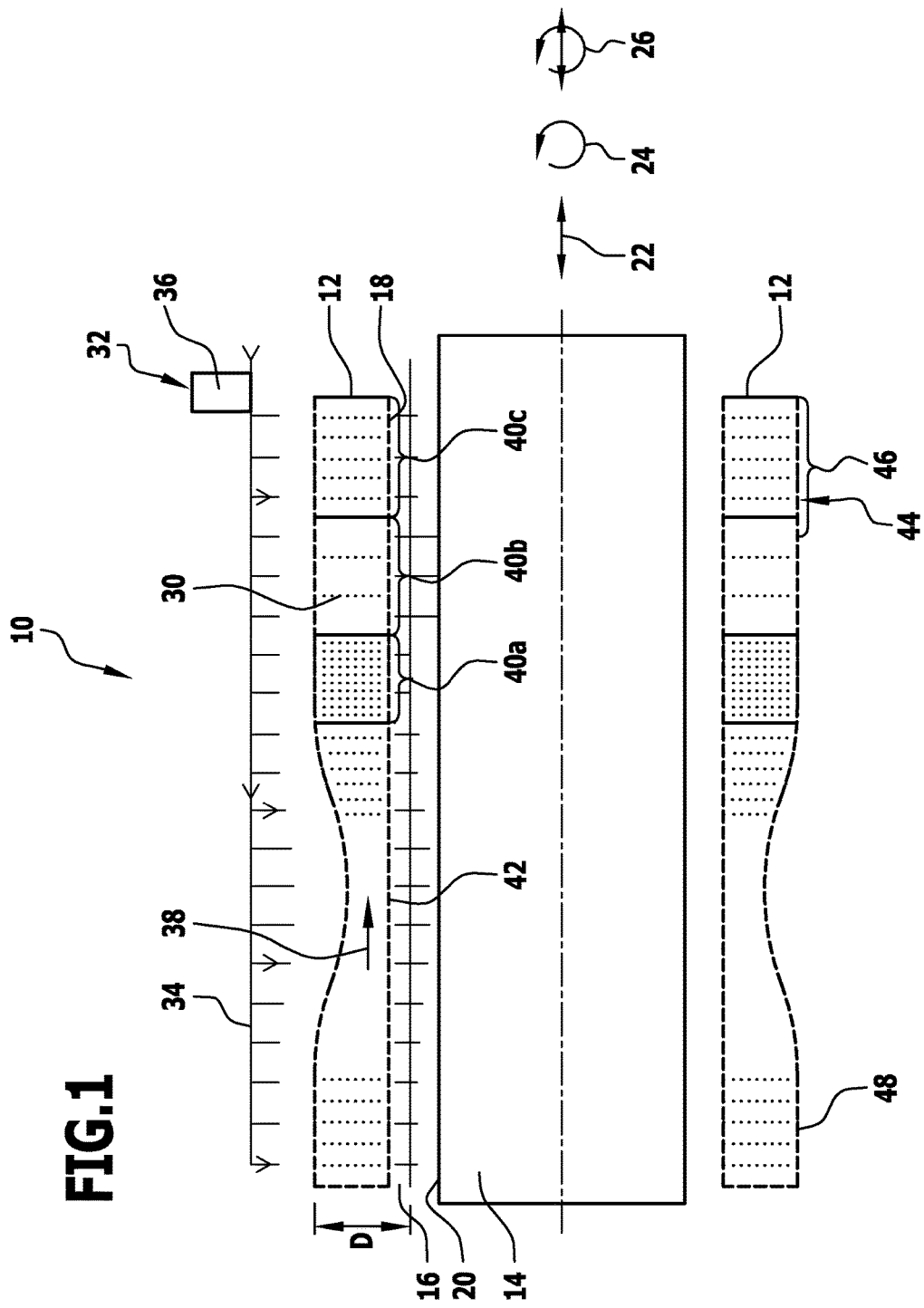
FIG. 1 shows a schematic exploded illustration of an exemplary embodiment of a sliding bearing device in accordance with the invention in the form of a sectional view.

A first exemplary embodiment of a sliding bearing device in accordance with the invention which is shown schematically in FIG. 1 in the form of an exploded sectional view and is referenced 10 therein comprises a bearing seating 12 and a bearing body 14. The bearing seating 12 accommodates the bearing body 14.

In the exemplary embodiment shown, the bearing seating 12 is in the form of a sleeve having a (hollow) cylindrical interior space 16. The interior space 16 is bounded by a first sliding surface 18 of the bearing seating 12. The first sliding surface 18 forms a surface of the bearing seating 12 which faces the bearing body 14.

The bearing body 14 is in the form of a rod and is mounted in the interior space 16.

In one exemplary embodiment, the bearing body 14 is in the form of a cylindrical rod.

The bearing body 14 has a second sliding surface 20 which faces the first sliding surface 18 and contacts it. The bearing body 14 is moveable relative to the bearing seating 12 in the interior space 16, whereby the second sliding surface 20 is guided such as to slide on the first sliding surface 18.

In one embodiment, the sliding bearing device 10 is in the form of a sliding contact bearing. In this case, the bearing body 14 is moveable linearly relative to the bearing seating 12. This is designated in FIG. 1 by the reference symbol 22.

It is also possible for example for the sliding bearing device 10 to be in the form of a rotary sliding bearing device. In this case, the bearing body 14 is in the form of a shaft which is rotatable or is pivotal relative to the bearing seating 12 in the interior space 16. This is designated in FIG. 1 by the reference symbol 24.

It is also possible for the sliding bearing device 10 to be in the form of a rotary contact sliding bearing. In this case the bearing body 14 can carry out both a linear movement and a rotary or pivotal movement relative to the bearing seating 12. This is designated in FIG. 1 by the reference symbol 26.

Figure 2:
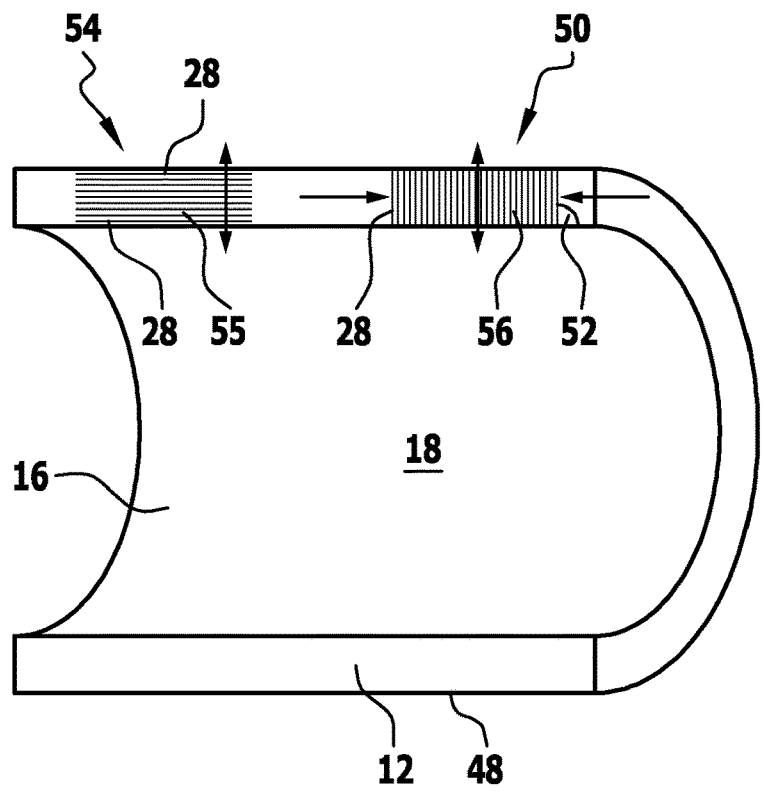
FIG. 2 a partial sectional illustration of an exemplary embodiment of a bearing seating for a shaft in the form of a perspective view.

In the case of the sliding bearing device 10, the bearing seating 12 is made of a fibre composite material having an open pore structure wherein the fibres 28 in the fibre composite material are carbon fibres for example (c.f. FIG. 2 for example).

For example, the bearing seating 12 is made of a ceramic fibre composite material (CMC—Ceramic Matrix Composite) wherein the fibres are carbon fibres for example. It is also possible for example for the fibre composite material to comprise a porous metal matrix in which fibres such as carbon fibres are arranged.

In one exemplary embodiment, the bearing seating 12 is made of C/C. The bearing seating 12 is then an open-pore carbon body having a carbon matrix in which carbon fibres are arranged.

The carbon fibres are preferably aligned. The aligned arrangement can be effected by means of long fibres and/or by means of aligned short fibres.

Due to the open-pore structure of the material of the bearing seating 12, channels 30 are formed therein. Hereby, the channels 30 extend straight through the bearing seating 12 and emerge at the first sliding surface 18.

A typical average size of pores in the open-pore structure lies in a range of between 5 µm (having a D10 distribution for example) and 40 µm (having a D80 distribution for example) and between 10 µm (in particular D10) and 20 µm (in particular D80) for example. In particular, the pores of the open-pore structure are produced by a pyrolysis process.

The open-pore carbon body is manufactured by means of the methods described in DE 10 2007 040 502 A1 for example, wherein in particular long fibres can also be used instead of short fibres. The raw material thereby is, for example, a wetted powder mixture consisting of powdered resin (in particular a phenolic resin) and a cellulose-containing powder such as a wood powder. (The humidity in the powder charge preferably amounts to 24.5% up to 50%.) The powder charge is introduced into an appropriate pressing device and carbon fibres are then integrated therein. This is followed by a compression and heating process.

As the raw material, a fluidic two-component mixture of resin and polymer material for example could also be used as the carbon precursor. A preform incorporating C-fibres is accordingly produced.

The preform that has been produced in such a manner is subsequently pyrolysed. The corresponding green body preform is pyrolysed in an inert gas atmosphere such as in a nitrogen atmosphere at normal pressure at maximum temperatures which lie between 800° C. and 1700° C. for example. This then results in an open pored carbon body having a carbon fibre structure.

The pressing device employed is preferably selected in such a way that the open-pored carbon body is close to its final contour, i.e. that its contour corresponds at least approximately to the bearing seating 12 (or the bearing body 14), the outlay required for the production of the final bearing seating 12 (or the final bearing body 14) from the end product of the pyrolysis process thereby being minimized.

In one exemplary embodiment, a fluid supply device 32 is provided. This, for example, comprises a distributor 34 which is positioned on the bearing seating 12 and in particular on a side which is remote from the first sliding surface 18. Furthermore, the fluid supply device 32 comprises a pumping device 36. Fluid can be supplied to the distributor 34 by the pumping device 36 and then fed from there through the channels 30 to the first sliding surface 18.

A flowable lubricating fluid in gaseous form or in liquid form for example can be provided to the first sliding surface 18 (and hence too, to the second sliding surface 20) by the fluid supply device 32. Alternatively, a cooling fluid can supplied to the first sliding surface 18 and thus to the second sliding surface 20. In principle, it is also possible for the lubricating fluid to additionally function as a cooling fluid.

It is possible for the open-pore structure of the bearing seating 12 to vary in (at least) one direction 38. This direction 38 is, in particular, a longitudinal direction along which the bearing seating 12 extends. By virtue of an appropriately varied construction, it is possible to achieve a spatially varying application of fluid to the first sliding surface 18 (and hence too, to the second sliding surface 20) along this direction 38. The channel structure incorporating the channels 30 of the bearing seating 12 is thereby graded. Adaptation to a special application can then be effected. For example, certain regions can thereby be subjected to more fluid (in particular lubricating fluid) than other regions.

In FIG. 1, there is depicted an example comprising regions 40a, 40b and 40c of the bearing seating 12 in which the density of the channels 30 is different. The channel density is greater in the depicted region 40a than in the region 40c, in particular, with regard to channels opening out into the first sliding surface 18. In turn, the channel density in the region 40c is greater than in the region 40b.

It is also possible for example to vary a thickness D of the bearing seating 12 at least in one direction (and, for example, in the direction 38). A corresponding region 42 within which the thickness is not uniform is indicated in FIG. 1.

If, for example, the thickness D in the region 42 is smaller than outside this region, then, in principle, the effective channel length between an input coupling position at the distributor 34 and an output coupling position (the mouth) at the first sliding surface 18 is shorter in this region than it is outside of this region 42. Within such a region for example, a fluid can then be supplied to the first sliding surface 18 at a greater pressure than outside of this region 42.

Optimal adaptation to particular applications is possible by appropriate adjustment of the channel structure 30.

Provision can also be made for the sliding bearing device 10 to comprise a heat dissipating device 44. The heat dissipating device 44 serves to remove heat from the sliding bearing device 10.

In one exemplary embodiment, the heat dissipating device 44 comprises one or more elements 46 made of a material having metallic thermal conductivity. Such an element 46 is made of copper for example.

In particular, the element 46 is positioned on the bearing seating 12 such as to be in thermal contact outside the interior space 16.

For example, the element 46 is positioned, in the form of a galvanised layer, on a side 48 of the bearing seating 12 that is located opposite the first sliding surface 18. The element 46 is manufactured by galvanising the side 48 of the bearing seating 12.

In particular, provision is then made for carbon fibres to lead from the heat dissipating device 44 to the first sliding surface 18. Carbon fibres having a high thermal conductivity are then preferably used as the fibres 28. For example, pitch fibres have a high thermal conductivity which lies longitudinally in the range of between 620 W/mK and 1,170 W/mK. Such highly heat-conductive carbon fibres are manufactured on the basis of a pitch precursor.

In regard to carbon fibres having high thermal conductivity, reference is made to the company information sheet "CFK Bauteile aus hochwärmeleitenden Kohlenstofffasern" issued by HTS GmbH, Am Glaswerk 6, 01640 Coswig, www.htsdd.de.

By virtue of the fibres 28 having a correspondingly high thermal conductivity, heat in the sliding bearing device 10 can then be fed, in particular, from the bearing body 14 and the bearing seating 12 within the region of the interior space 16, to the heat dissipating device 44 and removed from there.

In an exemplary embodiment which is indicated in FIG. 2 by the reference symbol 50, fibres 28 are oriented in such a way that they end at an acute angle 52 at the first sliding surface 18. This acute angle 52 is, in particular, greater than 45° taken with reference to the first sliding surface 18. In the embodiment shown in FIG. 2, this acute angle 52 is 90° i.e. the fibres meet the first sliding surface 18 at least approximately perpendicularly.

It is also possible (as indicated in FIG. 2 by the reference symbol 52) for the fibres 28 to lie parallel to the first sliding surface 18. In this case, the fibres 28 do not end at the first sliding surface 18.

In principle, it is possible for the corresponding bearing seating 12 to comprise only one region 50 in which the fibres 28 meet the first sliding surface 18 at the acute angle 52 (which could also be different for different fibres).

It is also possible for the bearing seating 12 to be formed in such a way that the fibres 28 run parallel to the first sliding surface 28 or at least do not meet it, for example, by means of an appropriate winding process.

Furthermore, it is possible for the bearing seating 12 to comprise different regions 50, 54 in which the orientation of the fibres is different, whereby these regions 50, 54 are then separated from each other.

It is also possible for fibres 28 to be provided in the same region 50 or 54 which meet the first sliding surface 18 as well as fibres which are oriented parallel to the first sliding surface 18.

If the fibres 28 corresponding to the region 50 meet the first sliding surface 18 at an acute angle 52, then heat dissipation by means of a heat dissipating device 44 can also be achieved in a simple manner by the use of fibres 28 having a high thermal conductivity.

The sliding bearing device 10 in accordance with the invention functions as follows:

The bearing body 14 is mounted in the bearing seating 12. The bearing body 14 is moveable relative to the bearing seating 12 in corresponding types of movement 22 or 24 or 26.

In one exemplary embodiment, lubrication is effected by means of a lubricating fluid which is provided by the fluid supply device 32 when the sliding bearing device 10 is in operation. This lubricating fluid is supplied to the first sliding surface 18 and hence too, to the second sliding surface 20 through the open-pore channel structure incorporating the channels 30.

In principle, a sliding bearing device 10 can accommodate high forces since the supporting surface (the first sliding surface 18 and the second sliding surface 20) is large and consequently a reduced pressure per unit area is attainable in comparison with roller bearings for example. The bearing friction between the bearing body 14 and the bearing seating 12 leads to the development of heat. A lubricating effect is achieved by means of the lubricating fluid and the ensuing heat can be removed.

In addition, heat can be purposefully removed through the material of the bearing seating 12 by the heat dissipating device 44.

Optimal lubrication thereby results. This can be controlled and carried out effectively, whereby cooling of the sliding surfaces 18, 22 is achieved.

In particular, the channel structure is formed in such a way that the entire first sliding surface 18 (which then contacts the second sliding surface 20) comprises appropriate channel openings for the lubricant supply.

In principle, the porosity and permeability of the bearing seating 12 incorporating the open-pore fibre composite material is adjustable and also spatially adjustable. Optimized adaptation to special requirements thereby results.

The fluid (lubricating fluid, cooling fluid) can be fed in such a way that the entire contact area between the first sliding surface 18 and the second sliding surface 20 is subjected directly to the fluid. The corresponding lubricating film is then directly effective at the points of friction between the bearing body 14 and the bearing seating 12 and, at the same time, provides cooling directly at the source of the heat.

Lubricating fluid is not gradually used up at the first sliding surface 18 and at the second sliding surface 20 but rather, it is supplied locally through the micro-pore material of the bearing seating 12 over a large surface area and can thereby be constantly supplied.

If the bearing seating 12 is made from a ceramic fibre composite material consisting of C/C then, as a further advantage, this results in the bearing seating 12 exhibiting only a very small thermal expansion or no thermal expansion at all (in the case of C/C serving as the material of the bearing seating 12). Furthermore, C/C serving as the material of the bearing seating 12 exhibits a high thermal shock resistance. Furthermore, C/C does not have a melting phase. Consequently, blockage of the sliding bearing device 10 (blocking the movement of the bearing body 14 of the bearing seating 12) cannot occur even under a high load.

Furthermore, C/C or fibre-ceramic composite materials have highly ductile (not liable to brittle fracture) material properties compared with monolithic ceramic materials for example.

Furthermore, the density of C/C or fibre-ceramic composite materials is relatively small compared with metals for example.

The sliding bearing device 10 in accordance with the invention exhibits good emergency running properties. Even if lubricating fluid is no longer being supplied there is still a good sliding pairing.

The sliding bearing device 10 can also be designed as a dry plain bearing for example, in particular, if C/C is used as the material for the bearing seating 12.

"Intrinsic" lubrication is achieved by means of the fibres 28 and in particular carbon fibres which are parallel with and/or meet the first sliding surface 18 at an acute angle 52. The wear on the fibres 28 is considerably smaller than in the case of a graphitic material for example.

In dependence on the application, it can be advantageous for the fibres 28 on the first sliding surface 18 to be oriented in parallel therewith and/or come up against the first sliding surface 18 at the acute angle 52.

Furthermore, due to an active application of pressure over a large surface area in the case of an open-pore fibre composite material, the effect can be achieved that fluid is guidable through the bearing seating 12 without gap cavitation.

The sliding bearing device 10 can be operated under heavy loads (high numbers of revolutions, high forces), whilst the size thereof can be kept small, and high reliability with a long lifetime is attainable whereby the production costs are capable of being held relatively small.

If surface degradation occurs whilst the sliding bearing device 10 is in operation (this is indicated in FIG. 2 by the reference symbol 55), then none of the supporting fibre strands will be severed thereby. In the case where the fibres 28 meet the first sliding surface 18 at an acute angle 52, only the fibre ends of the fibres 28 will degrade, this being structurally uncritical.

In the regions 54, there exists a high load-carrying capacity in the radial direction, in particular if layer stacks incorporating fibres 28 are mechanically pre-compressed in the axial direction during installation in order to prevent a de-laminating process. In this case too, none of the supporting fibre strands is severed.

For example, the bearing seating 12 is made from the fibre composite material incorporating carbon fibres 28 and the bearing body 14 (in particular, one in the form of a shaft or rod) is made of metal.

It is also possible for example for the bearing body 14 to be made of a fibre composite material comprising fibres (C/C or a ceramic fibre composite material or a porous metal material for example). The bearing seating 12 can then be made of a metallic material. A pairing is also possible wherein both the bearing body 14 and the bearing seating 12 are made of a fibre composite material comprising fibres 28.

For example, the element 14 in accordance with FIG. 1 is static and the element 12 is rotatable with respect to the element 14; this forms an external shaft. By virtue of a construction that is in principle the same as that shown in FIG. 1, the bearing body is then made from a porous fibre composite material.

Furthermore, it is possible in the example in accordance with FIG. 1 for the bearing seating 12 to be made entirely of the fibre composite material comprising fibres 28. However, it is also possible for example, for a carrier region to be provided which is made of a material other than that of the sliding region of the bearing seating 12 on which the first sliding surface 18 is formed. For example, the carrier region is not then fibre-reinforced.

If, for example, provision is made for a shaft made from a fibre composite material comprising carbon fibres, then a core region may be provided as a carrier region which exhibits greater mechanical rigidity than the sliding region on which the second sliding surface 20 is then formed.

Figure 3:
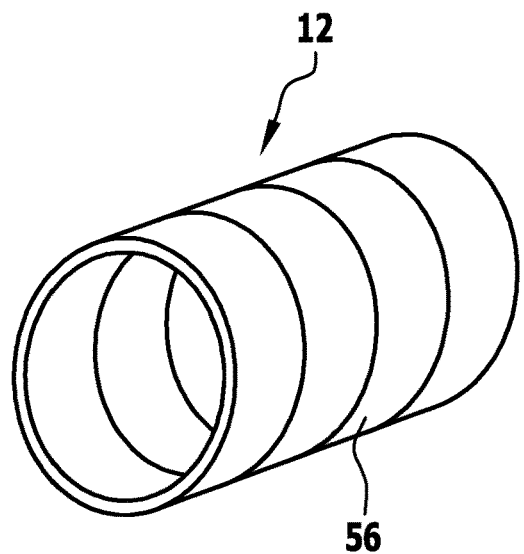
FIG. 3 a schematic illustration of an exemplary embodiment of a bearing seating for a shaft in the form of a bearing body.
Figure 4:
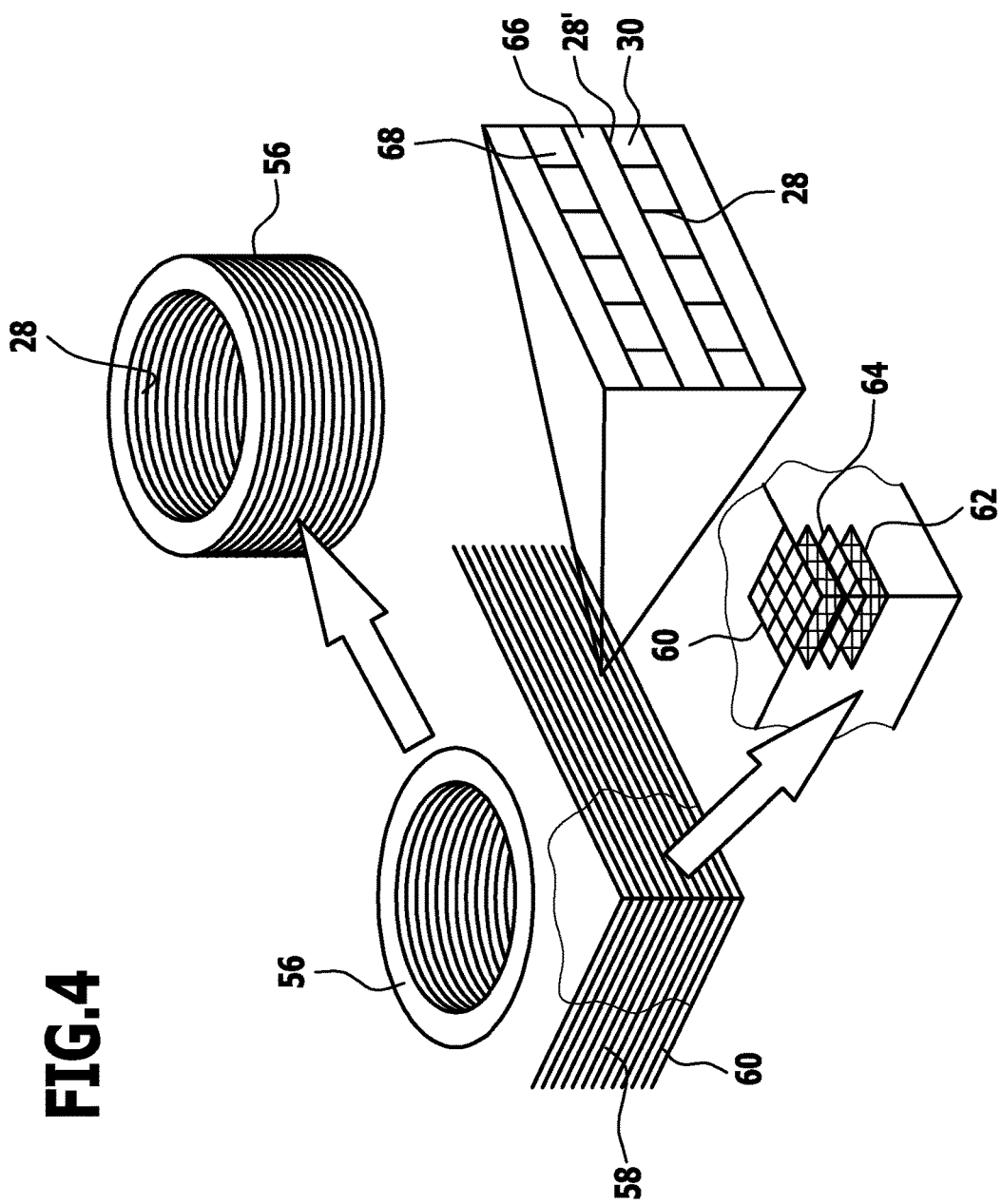
FIG. 4 a schematic partial step in a manufacturing process for a bearing seating.

Provision is made in one exemplary embodiment for the bearing seating 12 to be composed of a plurality of ring segments 56 (FIGS. 3, 4). The ring segments 56 are connected to one another. The bearing seating 12 can be produced from such ring segments 56 in a simple manner.

To this end for example, one commences from rovings 58 (FIG. 4) which comprise a plurality of layers 60 of a woven fabric (or knitted fabric or non-crimp fabric) consisting of carbon fibres 28 for example.

The carbon fibres 60 can be oriented in the corresponding layers with differing orientations such as a ±45° layer (reference symbol 62 in FIG. 4) or 0/90° (reference symbol 64 in FIG. 4) for example.

A ring segment 56 can then be produced from such a layered body by means of a stamping process for example.

The fibre composite material is produced on the ring segment 56 before or after production from the structure incorporating the layers 60. To this end, there is a resin impregnation process with appropriate curing and a following pyrolysis process for the purposes of producing the open-pore structure.

The ring segments are then connected to one another or the ring segments are already connected to one another by the layered structure.

A material structure 66 on a manufactured ring segment 56 is indicated in FIG. 4 by a schematic micrograph. Fibres 28 are recognizable. Furthermore, channels 30 are indicated. The regions 68 between the channels 30 and the fibres of synthetic material 28 are formed by carbon phases in the case of a C/C material for example.

Due to this form of production from ring segments 56, the effect can be achieved in a simple manner that fibres 28 meet the first sliding surface 18 at an acute angle 52 for example.

A fibre 28' which is indicated in FIG. 4 meets the first sliding surface 28 approximately perpendicularly.

A bearing body consisting of a fibre composite material in the form of a shaft for example can be produced in an analogous manner from disk elements.

In a second exemplary embodiment of a sliding bearing device which is shown in FIGS. 5 and 6 and designated by 70 therein, a shaft 72 is provided as the bearing body. The shaft 72 has a collar 74. Furthermore, a sleeve 76 is provided as the bearing seating. In principle, the sleeve 76 is structurally exactly the same as the bearing seating 12. It comprises a first sliding surface by means of which it contacts the shaft 72 which comprises a corresponding second sliding surface.

The sleeve 76 is made of an open-pore fibre composite material incorporating fibres 28.

A fluid supply device corresponding to the fluid supply device 32 is provided.

Between the collar 74 and the sleeve 76, there is provided on the end face of the sleeve 76 a sliding surface pairing 78a, 78b between the sleeve 76 and the shaft 72 in addition to the corresponding first sliding surface 18 or the second sliding surface 20.

Fluid and in particular lubricating fluid can also be supplied to the sliding surface pairing 78a, 78b. The channel structure in the sleeve 76 is appropriately formed in order to make this possible.

The sliding bearing device 70 comprises a housing 80.

Provision may be made hereby for the structure of the sleeve 76 together with the shaft 72 to be held on the housing 80 by means of a swivel bearing 82. The swivel bearing 82 for example comprises a convex spherical region 84 which is positioned on the sleeve 76 and is firmly connected thereto. The housing 80 for example comprises a concave spherical region 86 in which the convex spherical region 84 is accommodated.

Moment-compensation can be achieved if necessary by means of such a swivel bearing 82.

In a third exemplary embodiment of a sliding bearing device in accordance with the invention which is shown in FIGS. 7 to 9 and designated therein by 90, the combination of a shaft and a sleeve is formed in the same way as was the case for the sliding bearing device 70. The same reference symbols are used for the equivalent elements.

A carrier 92 is positioned on the sleeve 76. In particular, this carrier is in the form of a sleeve.

A housing 94 is provided.

The sleeve 76 together with the shaft 72 are, for example, mounted on the housing 94 by means of the carrier 92 via a membrane arrangement 96. Secondary bending moments can be intercepted due to the process of mounting the sleeve 76 on the housing 94 by means of the membrane arrangement 96.

In the case of the sliding bearing device 90, there is provided a sealing device 98 which serves for sealing between the sleeve 76 and the shaft 92. This sealing device 98 is, for example, formed in such a way that a blocking gas is injected in order to prevent in particular the escape of the lubricating fluid.

Compared to the position in accordance with FIG. 7, the sliding bearing device 90 is shown in FIG. 9 in a position in which the sleeve 76 together with the shaft 72 are tilted relative to the housing 94, whereby the membrane arrangement 96 permits this tilting process.

The combination of the sleeve 76 and the shaft 72 is tilted through a tipping angle 100 compared with the position in accordance with FIG. 7.

A further exemplary embodiment of a sliding bearing device in accordance with the invention which is shown in FIG. 10 and designated by 102 therein, comprises a shaft 104 having an inclined surface 106. A sliding surface corresponding to the second sliding surface 20 is formed on the inclined surface 106. This is designated 20' in FIG. 10.

A sleeve 108 corresponding to the bearing seating 12 is formed on the shaft 104. This comprises a first sliding surface corresponding to the first sliding surface 18. This is designated 18' in FIG. 10. Only a part of the sleeve 108 is depicted in the sectional view in accordance with FIG. 10.

In principle, the sleeve 108 is constructed in like manner to that described above. A fluid supply device 32 is associated therewith. A sealing device corresponding to the sealing device 98 for the sliding bearing device 90 may be provided.

The sliding bearing device 102 is in the form of an angular contact bearing. A rotational axis 110 of the shaft 104 does not lie parallel to the sliding surfaces 18', 20' but rather, the sliding surfaces 18', 20' are disposed at an angle to this rotational axis 110. (In the case of the sliding bearing device 10, a rotational axis of the bearing body 14 or a linear direction of movement of the bearing body 14 is parallel to the first sliding surface 18 and the second sliding surface 20.)

Otherwise, the sliding bearing device 102 functions as described above.

Figure 11:
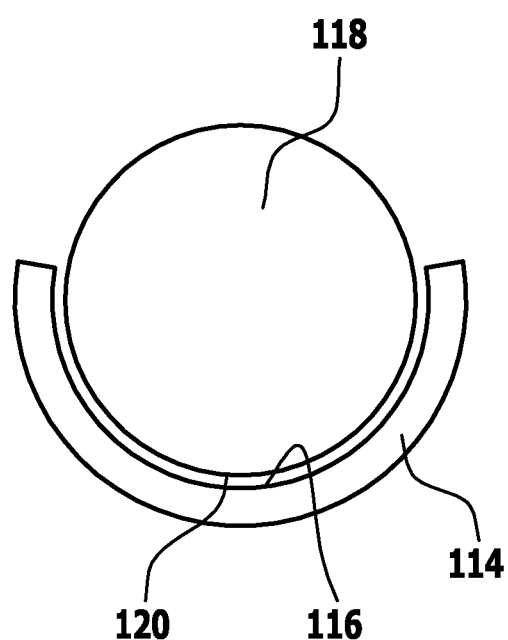
FIG. 11 a view of a further exemplary embodiment of a sliding bearing device in accordance with the invention.

In a further exemplary embodiment of a sliding bearing device which is shown schematically in FIG. 11 and denoted by 112 therein there is provided a bearing seating in the form of a bearing shell 114 which is made of an open-pore fibre composite material incorporating fibres 28. The bearing shell 114 has a concavely spherical first sliding surface 16.

A ball body having a correspondingly convexly spherical surface is provided as a bearing body 118. It comprises a second sliding surface 120 which is convexly spherical. The second sliding surface 120 slides on the first sliding surface 116.

Such sliding bearing devices 112 are used in connection with circulating pumps for example. Reference is made exemplarily in this context to EP 1 593 852 A1 or EP 2 276 934 A1.

Otherwise, the sliding bearing device 112 functions as described above.

LIST OF REFERENCE SYMBOLS 10 sliding bearing device (first exemplary embodiment)
12 bearing seating
14 bearing body
16 interior space
18, 18' first sliding surface
20, 20' second sliding surface
22 linear movement
24 rotational movement
26 linear-rotational movement
28, 28' fibres
30 channel
32 fluid supply device
34 distributor 36 pumping device
38 direction
40a region
40b region
40c region
42 region
44 heat dissipating device
46 element
48 side
50 region
52 acute angle
54 region
55 surface degradation
56 ring segment
58 roving
60 layer
62 ±45° layer
64 0°/90° layer
66 material structure
68 region
70 sliding bearing device (second exemplary embodiment)
72 shaft
74 collar
46 sleeve
78a sliding surface
78b sliding surface
80 housing
82 swivel bearing
84 convexly spherical region
86 concavely spherical region
90 sliding bearing device (third exemplary embodiment)
92 carrier
94 housing
96 membrane arrangement
98 sealing device
100 tilt angle
102 sliding bearing device (fourth exemplary embodiment)
104 shaft
106 inclined surface
108 sleeve
110 rotational axis
112 sliding bearing device (fifth exemplary embodiment)
114 bearing shell
116 first sliding surface
118 bearing body
120 second sliding surface

What is claimed is:

1. Sliding bearing device comprising:
a bearing seating having a first sliding surface; and
a bearing body having a second sliding surface;
wherein the bearing body is accommodated by the bearing seating and the first sliding surface and the second sliding surface face each other;
wherein at least one of the bearing seating and the bearing body is made of an open-pore fibre composite material at least in a sliding region which forms the respective sliding surface; and
wherein at least one of (i) fibres of the fibre composite material are arranged in the sliding region such that the fibres end at the associated sliding surface at an acute angle to the sliding surface, and (ii) fibres of the fibre composite material run parallel to the respective sliding surface.

2. A sliding bearing device in accordance with claim 1, wherein fibres of the fibre composite material are carbon fibres.

3. A sliding bearing device in accordance with claim 1, wherein at least one of the bearing seating and the bearing body is made entirely of the same fibre composite material.

4. A sliding bearing device in accordance with claim 1, wherein:
at least one of the bearing seating and the bearing body comprises a carrier region on which the sliding region is arranged, and
the material of the sliding region and a material of the carrier region are different.

5. A sliding bearing device in accordance with claim 1, further comprising a fluid supply device by means of which a fluid is provided to channels of at least one of the bearing seating and the bearing body, wherein the channels are formed through the open-pore structure and lead to the respective sliding surface.

6. A sliding bearing device in accordance with claim 1, wherein the open-pore structure is formed such that fluid is provided to at least one of the entire first sliding surface which is in sliding contact with the second sliding surface, and the entire second sliding surface which is in sliding contact with the first sliding surface.

7. A sliding bearing device in accordance with claim 1, wherein the fibres are arranged in the sliding region at an acute angle of at least 45° to the sliding surface.

8. A sliding bearing device in accordance with claim 1, wherein:
a heat dissipating device is arranged on at least one of the bearing seating and the bearing body, and
fibres lead to the heat dissipating device.

9. A sliding bearing device in accordance with claim 8, wherein the heat dissipating device is galvanized.

10. A sliding bearing device in accordance with claim 8, wherein the fibres are pitch fibres.

11. A sliding bearing device in accordance with claim 8, wherein the heat dissipating device is made of a material having metallic thermal conductivity.

12. A sliding bearing device in accordance with claim 8, wherein the heat dissipating device is galvanized in a region which is spaced from the corresponding sliding surface.

13. A sliding bearing device in accordance with claim 1, wherein at least one of the bearing seating and the bearing body comprises a plurality of ring segments or disk segments which are connected to one another.

14. A sliding bearing device in accordance with claim 1, wherein the fibre composite material is C/C.

15. A sliding bearing device in accordance with claim 1, wherein the fibre composite material is a ceramic fibre composite material or a metallic material incorporating fibres.

16. A sliding bearing device in accordance with claim 1, wherein at least one of the bearing seating and the bearing body is formed such that at least one of the open porosity and a thickness of at least one of the bearing seating and the bearing body varies along at least one direction.

17. A sliding bearing device in accordance with claim 1, wherein at least one of:
the bearing body is a shaft and the bearing seating is a shaft seating, or
the bearing seating is a ring element and the bearing body is a rod, or
the bearing body is a ball bearing and the bearing seating is a bearing shell.

18. Turbopump or turbine or free piston motor, comprising at least one sliding bearing device, said at least one sliding bearing device comprising:
a bearing seating having a first sliding surface; and a bearing body having a second sliding surface;
wherein the bearing body is accommodated by the bearing seating and the first sliding surface and the second sliding surface face each other;
wherein at least one of the bearing seating and the bearing body is made of an open-pore fibre composite material at least in a sliding region which forms the respective sliding surface; and
wherein at least one of (i) fibres of the fibre composite material are arranged in the sliding region such that the fibres end at the associated sliding surface at an acute angle to the sliding surface, and (ii) fibres of the fibre composite material run parallel to the respective sliding surface.

* * * * *